(12) United States Patent
Biron et al.

(10) Patent No.: US 9,897,289 B2
(45) Date of Patent: *Feb. 20, 2018

(54) LIGHT FIXTURE WITH PHOTOSENSOR-ACTIVATED ADJUSTABLE LOUVER ASSEMBLY AND COLOR TEMPERATURE CONTROL

(71) Applicant: ABL IP Holding LLC, Decatur, GA (US)

(72) Inventors: Phoebus Biron, Sacramento, CA (US); James Mathew Ernst, Elk Grove, CA (US); Ryan Zaveruha, Stratford, CT (US)

(73) Assignee: ABL IP Holdings LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/416,465

(22) Filed: Jan. 26, 2017

(65) Prior Publication Data

US 2017/0138572 A1    May 18, 2017

Related U.S. Application Data

(63) Continuation-in-part of application No. 14/730,565, filed on Jun. 4, 2015.

(Continued)

(51) Int. Cl.
*F21V 11/04* (2006.01)
*F21V 14/08* (2006.01)
(Continued)

(52) U.S. Cl.
CPC ............ *F21V 14/08* (2013.01); *F21S 19/005* (2013.01); *F21V 11/04* (2013.01);
(Continued)

(58) Field of Classification Search
CPC ........ F21S 19/005; F21V 11/04; F21V 14/08; F21V 23/0464; F21V 23/0442; F21Y 2115/10; H05B 33/0845; H05B 33/0857
See application file for complete search history.

(56) References Cited

U.S. PATENT DOCUMENTS 3,902,056 A    8/1975  Aizenberg et al.
4,246,477 A    1/1981  Latter
(Continued)

OTHER PUBLICATIONS

Non Final Office Action for U.S. Appl. No. 14/730,565 dated Feb. 10, 2017, 10 pages.

(Continued)

*Primary Examiner* — Peggy Neils
(74) *Attorney, Agent, or Firm* — Kilpatrick Townsend & Stockton, LLP

(57) ABSTRACT

A light fixture includes a housing with a skylight aperture, and one or more louver blades spanning the skylight aperture. When open, the one or more movable louver blades block little of the light passing through the skylight aperture; in intermediate positions, the louver blades block a portion of the light; when closed, the louver blades block most light from passing through the skylight aperture. The light fixture also includes: a dimmable artificial light source configured to project artificial light toward the illuminated space; a light sensor that detects light illuminating the space; and a control unit that is integrated with the housing and communicates with the light sensor. The light sensor detects intensity and chromaticity information of the light illuminating the space. The control unit controls position of the louver blades and brightness and chromaticity of the dimmable artificial light source, in response to the light sensor.

12 Claims, 7 Drawing Sheets

Related U.S. Application Data

(60) Provisional application No. 62/007,622, filed on Jun. 4, 2014.

(51) Int. Cl.
*F21V 23/04* (2006.01)
*F21S 19/00* (2006.01)
*H05B 33/08* (2006.01)
*H05B 37/02* (2006.01)
*F21Y 115/10* (2016.01)

(52) U.S. Cl.
CPC ..... *F21V 23/0464* (2013.01); *H05B 33/0872* (2013.01); *H05B 37/0218* (2013.01); *H05B 37/0281* (2013.01); *F21Y 2115/10* (2016.08)

(56) References Cited

U.S. PATENT DOCUMENTS

| | | |
|---|---|---|
| 4,351,588 A | 9/1982 | Zullig |
| 4,539,625 A | 9/1985 | Bornstein et al. |
| 4,576,440 A | 3/1986 | Worthington |
| 5,099,622 A | 3/1992 | Sutton |
| 5,528,471 A | 6/1996 | Green |
| 5,581,447 A | 12/1996 | Raasakka |
| 5,716,442 A | 2/1998 | Fertig |
| 5,896,712 A | 4/1999 | Chao |
| 5,896,713 A | 4/1999 | Chao et al. |
| 6,035,593 A | 3/2000 | Chao et al. |
| 6,142,645 A | 11/2000 | Han |
| 6,219,977 B1 | 4/2001 | Chao et al. |
| 6,363,667 B2 | 4/2002 | O'Neill |
| 6,363,668 B2 | 4/2002 | Rillie et al. |
| 6,381,070 B1 | 4/2002 | Cheng et al. |
| 6,528,782 B1 | 3/2003 | Zhang et al. |
| 7,057,821 B2 | 6/2006 | Zincone |
| 7,146,768 B2 | 12/2006 | Rillie |
| 7,234,279 B2 | 6/2007 | Sincic et al. |
| 7,322,156 B1 | 1/2008 | Rillie et al. |
| 7,546,709 B2 | 6/2009 | Jaster et al. |
| 7,621,081 B2 | 11/2009 | Rillie |
| 7,638,743 B2 | 12/2009 | Bartol et al. |
| 7,639,423 B2 | 12/2009 | Kinney et al. |
| 7,736,014 B2 | 6/2010 | Blomberg |
| 7,781,713 B2 | 8/2010 | Papamichael et al. |
| 7,875,252 B2 | 1/2011 | Ma et al. |
| 7,976,189 B2 | 7/2011 | Osborn |
| 7,995,277 B2 | 8/2011 | Patterson |
| 8,018,653 B2 | 9/2011 | Jaster |
| 8,068,282 B1 | 11/2011 | Kastner et al. |
| 8,082,705 B2 | 12/2011 | Jaster et al. |
| 8,083,363 B2 | 12/2011 | Jaster |
| 8,098,433 B2 | 1/2012 | Rillie et al. |
| 8,104,921 B2 | 1/2012 | Hente et al. |
| 8,111,460 B1 | 2/2012 | Huang |
| 8,132,375 B2 | 3/2012 | Jaster |
| 8,139,908 B2 | 3/2012 | Moyer |
| 8,313,224 B2 | 11/2012 | Moyer |
| 8,371,078 B2 | 2/2013 | Jaster |
| 8,455,807 B2 | 6/2013 | Sun et al. |
| 8,459,851 B2 | 6/2013 | Wemmer |
| 8,568,011 B2 | 10/2013 | Rillie et al. |
| 8,569,977 B2 | 10/2013 | Lanham et al. |
| 8,601,757 B2 | 12/2013 | Jaster et al. |
| 8,622,560 B2 | 1/2014 | Di Trapani et al. |
| 8,746,942 B2 | 6/2014 | Bracale |
| 8,779,681 B2 | 7/2014 | Adler |
| 8,837,048 B2 | 9/2014 | Jaster |
| 8,896,924 B2 | 11/2014 | Weaver |
| 8,955,269 B2 | 2/2015 | Rillie |
| 8,958,157 B2 | 2/2015 | Rillie et al. |
| 8,982,467 B2 | 3/2015 | Jaster |
| 9,027,292 B2 | 5/2015 | O'Neill et al. |
| 9,052,452 B2 | 6/2015 | Maxey |
| 9,074,742 B1 | 7/2015 | Petrocy et al. |
| 9,101,011 B2 | 8/2015 | Sawada et al. |
| 9,127,823 B2 | 9/2015 | Jaster |
| 9,146,012 B2 | 9/2015 | Bartol et al. |
| 9,202,397 B1 | 12/2015 | Petrocy et al. |
| 9,210,768 B2 | 12/2015 | Adler et al. |
| 9,291,321 B2 | 3/2016 | Jaster |
| 9,322,525 B2 * | 4/2016 | Gommans .......... H05B 37/0218 |
| 9,416,940 B2 | 8/2016 | Di Trapani et al. |
| 2002/0060283 A1 | 5/2002 | Jordan et al. |
| 2007/0273290 A1* | 11/2007 | Ashdown .............. F21V 29/004 |
| | | 315/113 |
| 2010/0039799 A1 | 2/2010 | Levens |
| 2010/0103655 A1 | 4/2010 | Smith |
| 2011/0242810 A1 | 10/2011 | Lopez Querol et al. |
| 2012/0087113 A1 | 4/2012 | McClellan |
| 2013/0002144 A1* | 1/2013 | Adler ...................... F21S 2/00 |
| | | 315/153 |
| 2013/0083554 A1 | 4/2013 | Jaster |
| 2013/0293963 A1 | 11/2013 | Lydecker |
| 2014/0233256 A1 | 8/2014 | Orfield |
| 2014/0362567 A1* | 12/2014 | Dobbertin ............... F21S 8/061 |
| | | 362/231 |
| 2015/0035440 A1 | 2/2015 | Spero |
| 2015/0061500 A1 | 3/2015 | Yeh |
| 2015/0354223 A1 | 12/2015 | Biron et al. |
| 2015/0362143 A1 | 12/2015 | Baaijens et al. |
| 2015/0369434 A1 | 12/2015 | Baaijens et al. |
| 2015/0377435 A1 | 12/2015 | Liu et al. |
| 2016/0033100 A1 | 2/2016 | Hansson |
| 2016/0153194 A1 | 6/2016 | Kristensen |
| 2016/0153631 A1 | 6/2016 | Chen |
| 2016/0169465 A1 | 6/2016 | Jones et al. |
| 2017/0071046 A1* | 3/2017 | Petschulat .......... H05B 37/0218 |

OTHER PUBLICATIONS

Notice of Allowance for U.S. Appl. No. 14/730,565, dated Jul. 11, 2017, 10 pages.

* cited by examiner

LIGHT FIXTURE WITH PHOTOSENSOR-ACTIVATED ADJUSTABLE LOUVER ASSEMBLY AND COLOR TEMPERATURE CONTROL

CROSS REFERENCE TO RELATED APPLICATIONS

This application is a continuation-in-part application of U.S. patent application Ser. No. 14/730,565, filed Jun. 4, 2015, which claims the benefit of U.S. Provisional Patent Application No. 62/007,622, filed Jun. 4, 2014. Both of the above-identified patent applications are incorporated herein by reference in their entireties for all purposes.

FIELD OF THE INVENTION

This invention relates to skylights, light fixtures, and control of light levels internal and external to structures.

BACKGROUND

Skylights have long been used in buildings to transmit light through roofs and other structures, but the level of light in the building often is not controlled or must be controlled using manually operated shutters or louvers.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

In an embodiment, a light fixture delivers light to an illuminated space. The light fixture includes a housing that defines a skylight aperture therethrough, and one or more movable louver blades coupled to the housing and spanning the skylight aperture defined in the housing. In an open position, the one or more movable louver blades do not substantially block light from passing through the skylight aperture. In a closed position, the louver blades block substantially all light from passing through the skylight aperture. In intermediate positions between the open position and the closed position, the louver blades block a portion of light from passing through the skylight aperture. The light fixture also includes: a dimmable artificial light source that is integrated with the housing about a lower perimeter of the skylight aperture and that is configured to project artificial light toward the illuminated space; a light sensor that detects light illuminating the space and provides one or more signals in response thereto; and a control unit that is integrated with the housing and is communicatively coupled with the light sensor. The light sensor detects both intensity information and chromaticity information of the light illuminating the space, and the one or more signals convey at least the intensity information and the chromaticity information. The control unit receives the signal from the light sensor, and controls position of the louver blades and brightness and chromaticity of the dimmable artificial light source, in response to at least the one or more signals from the light sensor.

In an embodiment, a method controls light within an illuminated space. The method includes detecting a light illuminating the space with one or more sensors, wherein the light is characterized by an intensity and a color temperature; providing, by the one or more sensors, one or more signals that convey at least intensity and color temperature information of the light illuminating the space; controlling one or more louver blades, in response to the intensity information, to increase an external light admitted into the illuminated space when the intensity is less than a low light threshold; increasing an intensity of a dimmable artificial light source that projects artificial light into the illuminated space, in response to the intensity information, when the intensity is less than the low light threshold; and adjusting a chromaticity of the dimmable artificial light source, in response to the color temperature information, to adjust the color temperature of the light illuminating the space toward a desired color temperature.

BRIEF DESCRIPTION OF THE DRAWINGS

Illustrative embodiments herein are described in detail below with reference to the following drawings.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Among other purposes, the purposes of this invention are to:

A. Balance lighting in a specified space during daylight hours.
B. Control the amount of daylight entering a specified space.
C. Restrict the amount artificial light exiting a specified space and illuminating outer areas of a building, causing light nuisance for the surrounding or outer areas.
D. Sense color temperature of the daylight entering the specified space, and provide supplemental lighting to match the sensed color temperature and/or correct the color temperature to a desired color temperature.
E. Optionally, accomplish objectives A, B, C and/or D above in a single light fixture assembly, to minimize installation time and cost, as at least one option.

Figure 1:
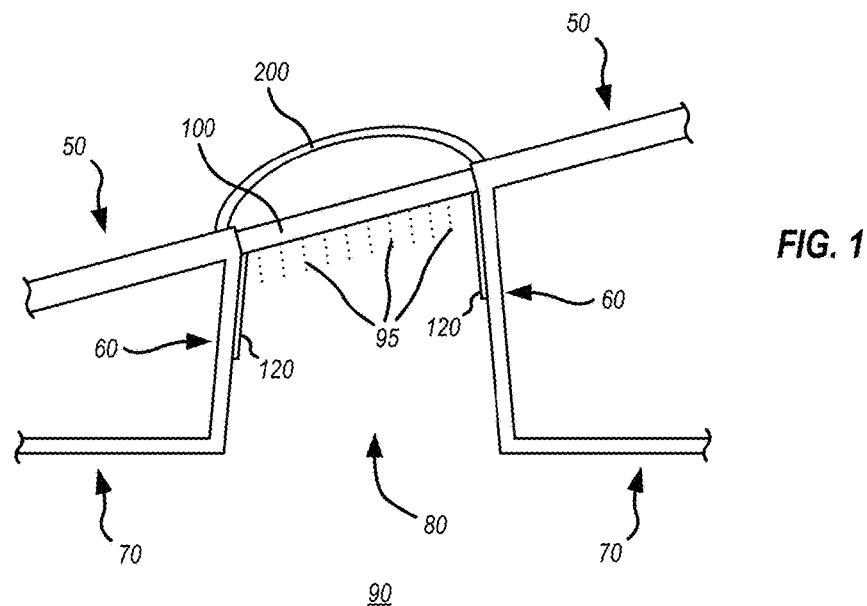
FIG. 1 is a cross sectional view of a portion of a structure illustrating a light fixture installed therein, according to an embodiment.
Figure 10:
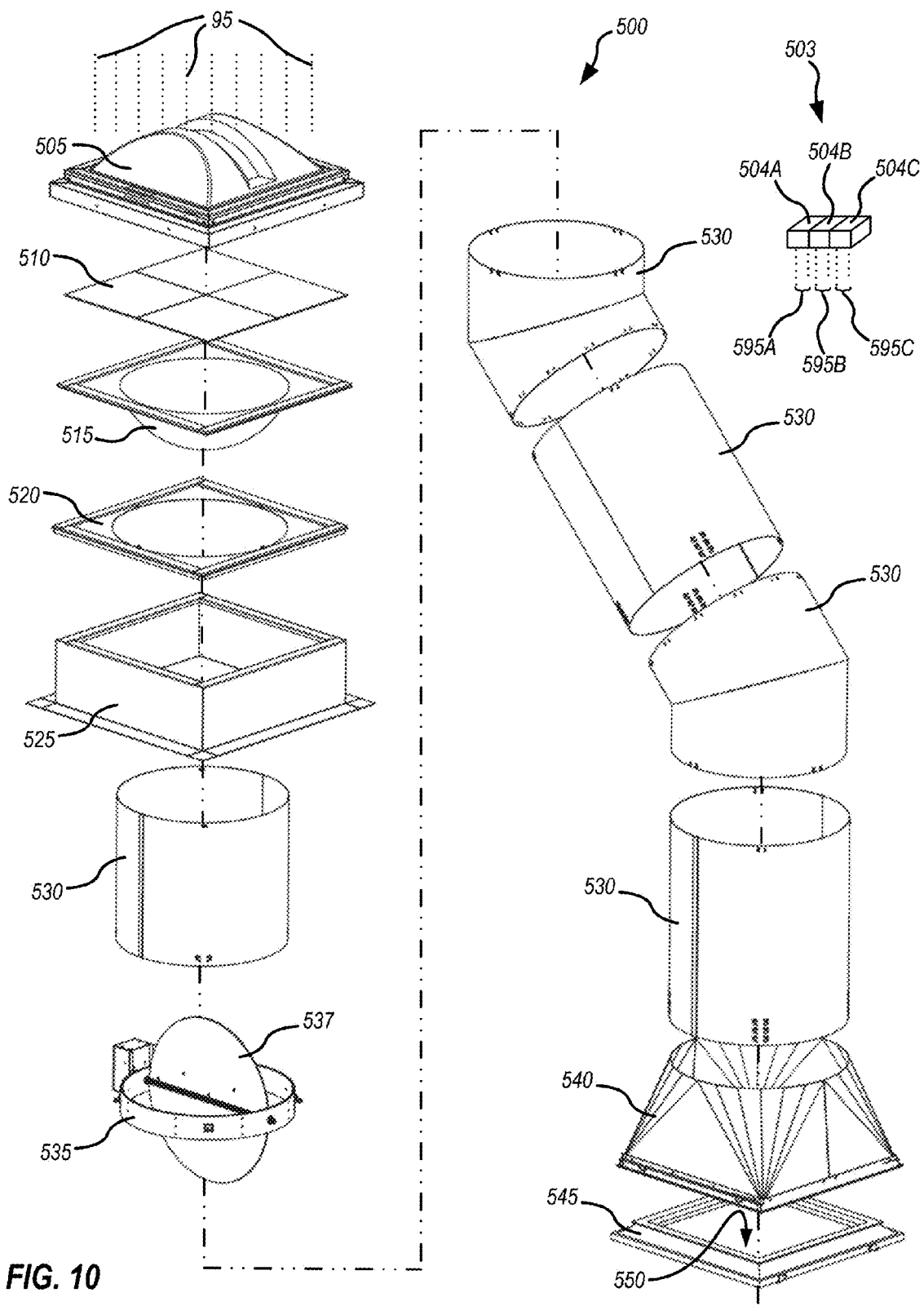
FIG. 10 is a schematic exploded diagram illustrating a light fixture, according to an embodiment.

FIG. 1 is a schematic cross sectional view of a portion of a structure, illustrating a light fixture 100 installed therein. Light fixture 100 is described further below and illustrates one embodiment only. All components illustrated in FIG. 1 are illustrative and not exhaustive; other embodiments herein may include some or all of the components illustrated in FIG. 1, and/or other components. For example, FIG. 10 illustrates a light fixture embodiment with different components than shown in FIG. 1. One of ordinary skill in the art, upon reading and comprehending the present disclosure, will be able to practice not only the specifically described concepts, but will readily recognize alternatives, equivalents, modifications, and intermediate combinations of the disclosed features, all of which are within the scope of the disclosure.

A roof 50 defines a skylight that is covered by a skylight cover 200. Light fixture 100 mounts within roof 50 at or below the skylight. Wall portions 60 typically adjoin and extend from roof 50 toward ceiling portions 70, which define a ceiling aperture 80 for light 95 to enter an illuminated space 90 beneath the skylight. Wall portions 60 may be reflective, and/or a reflective lining 120 may be installed that extends from a lower side thereof toward the ceiling aperture, to increase an amount of light 95 that reaches ceiling aperture 80 and passes into illuminated space 90. However, wall portions 60 and ceiling portions 70 may not exist in all cases, that is, light fixture 100 can be installed in locations wherein roof 50 is directly above illuminated space 90. In other embodiments, an internally reflective tube may conduct external light 95 to pass through a roof space to a luminaire below. Light 95 passes through light fixture 100 and/or is emitted by an artificial light source within light fixture 100, as described below, toward illuminated space 90. Advantageously, light fixture 100 is a compact unit that can be installed in existing roof skylight openings and/or ceiling apertures, and can provide light and lighting control for skylights of a variety of interior shapes and sizes. That is, light fixture 100 does not require mechanical alignment or operational coordination of different portions at the roofline and down to the ceiling aperture, and can be utilized in skylights of any orientation (e.g., generally horizontal, sloped or even vertical). Light fixture 100 can be of many sizes and shapes. When compatibility with typical roof construction is desired, light fixture 100 may be about four to six inches deep (see also FIG. 9).

Figure 2:
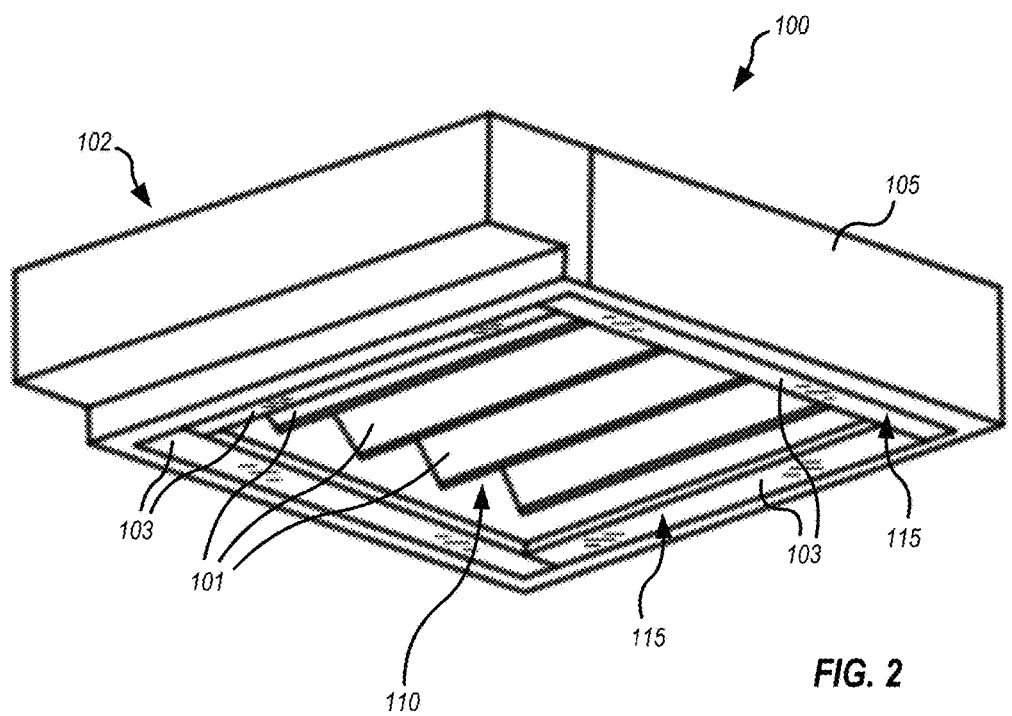
FIG. 2 is an isometric view illustrating an underside and two sides of a light fixture, in an embodiment.

FIG. 2 is an isometric view illustrating an underside and two sides of a light fixture 100. Light fixture 100 may be controlled manually or automatically, as discussed below. Light fixture 100 includes a housing 105 that defines a skylight aperture 110 therein. One or more louver blades 101 are coupled within and span skylight aperture 110, as shown. Housing 105 may be substantially rectilinear, as illustrated in FIG. 2 and elsewhere, such that louver blades 101 may be simple straight, flat shapes of identical length that each extend across skylight aperture 110; however in certain embodiments, housing 105 and/or skylight aperture 110 are not rectilinear, and louver blades 101 may have differing shapes and/or lengths so as to span skylight aperture 110 completely. Louver blades 101 are actuated by a control unit 102 and help control or restrict the amount of light (e.g., either daylight or artificial light) going through skylight aperture 110 in either direction. That is, as discussed below, louver blades 101 can be closed to prevent nuisance light or light pollution from exiting a structure in which light fixture 100 is installed.

Figure 3:
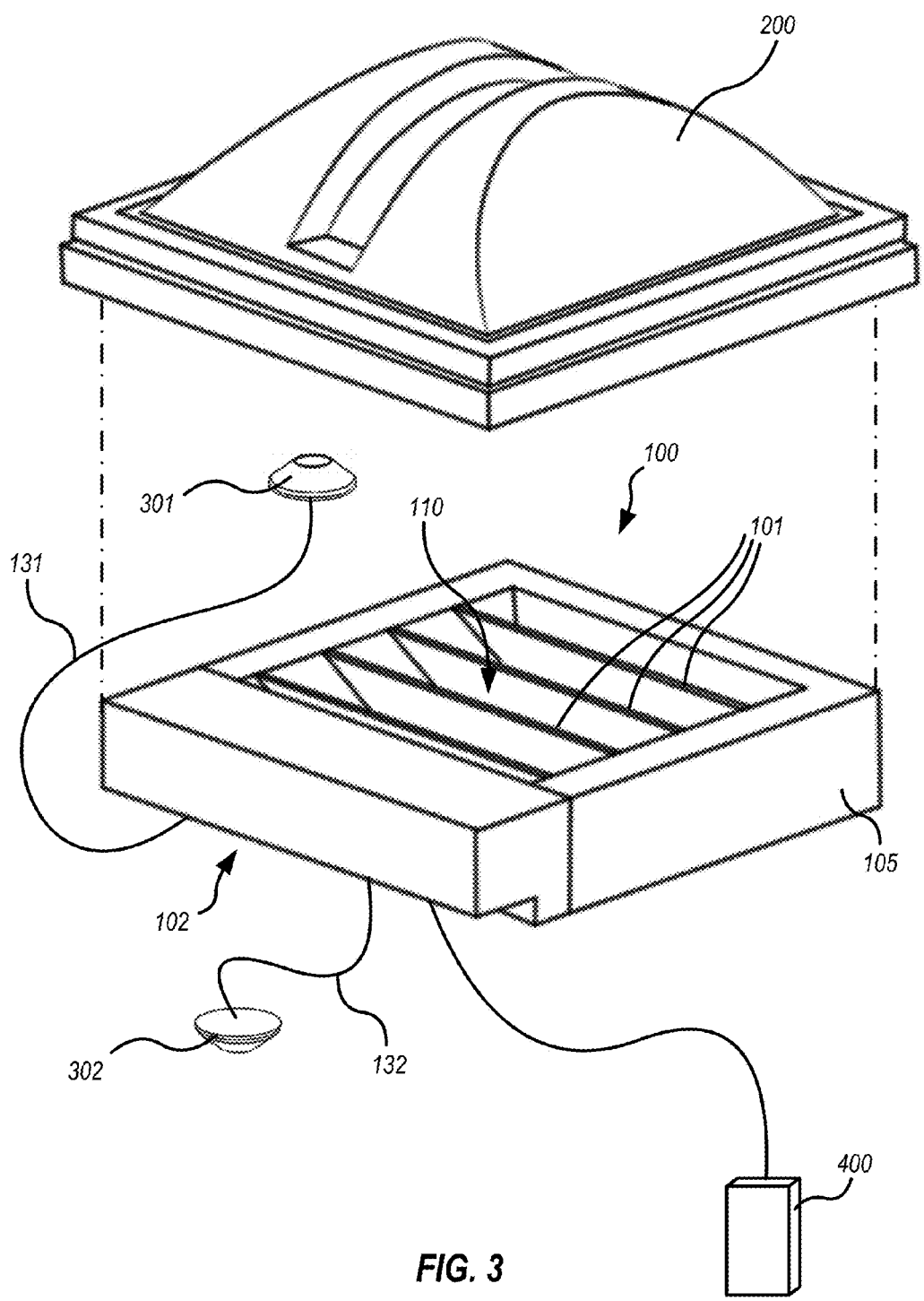
FIG. 3 is an exploded, schematic view illustrating an upper side and two sides of the light fixture shown in FIG. 2, in an embodiment, together with a skylight cover, light sensors and a user control panel.

Louver blades 101 may be driven by either a DC, Stepper, Servo or similar motorized device which communicates through a motor controller/driver and lighting controller combination, which is identified in FIGS. 2 and 3 as control unit 102, but it should be understood that control unit 102 may be a single unit that is provided within housing 105, as shown, or may be a control functionality provided by multiple components that are interconnected but physically distributed.

Louver blades 101 may be provided with reflective upper and/or lower surfaces; reflective lower surfaces help to reflect light downward into an illuminated space 90 when blades 101 are closed, to maximize light to the illuminated space 90. Similarly, reflective upper surfaces may reflect at least a portion of natural light that would otherwise enter skylight aperture 110 (that is not captured for lighting purposes) upwardly, to reduce heat retention on sunny, bright days. Although not illustrated as such herein (and not required), light fixture 100 is typically installed within a skylight in a structure, to control natural light coming through the skylight to an illuminated space, and to provide artificial light as needed to supplement the natural light.

Light fixture 100 also includes one or more dimmable artificial light sources 103. In embodiments, light sources 103 include a plurality of light-emitting diodes (LEDs) or other light emitters. Individual ones of the light emitters may be dimmable or can at least be turned on or off individually, such that a net light output of light source 103 is dimmable. The light emitters are typically disposed along one or more sides of housing 105 and are oriented so that they project emitted light away from light fixture 100 toward illuminated space 90. One or more optional diffusers 115 may be integrated with housing 105 and are disposed so as to diffuse the emitted light (e.g., in the orientation shown in FIG. 2, diffusers 115 are disposed beneath the light emitters).

Light sources 103 feature adjustable chromaticity. This enables control of a chromaticity of either light from light source 103 alone, and/or a sum of light provided by some amount of light 95 passing through louver blades 101, plus the light from light source 103. Sensors, described further below, can detect light in the illuminated space and feed information to control unit 102 for use in adjusting a chromaticity of light source 103 to achieve either of these outcomes. In some embodiments, light source 103 features one or more "warm white" LEDs, having a chromaticity that can be characterized as a low color temperature such as 2500K to 3000K, and one or more other "cool white" LEDs having a chromaticity that can be characterized as a high color temperature such as 5000K to 7000K. In these embodiments, control unit 102 drives or dims the appropriate "white" LEDs so as to provide a desired, combined chromaticity, alone or mixed with some amount of light 95. In other embodiments, light source 103 features LEDs characterized by distinct spectral bands, for example red, green, and blue LEDs, as opposed to "white" LEDs. That is, the dimmable artificial light sources herein may have a chromaticity that may not be characterized as having a color temperature, but at least has a spectral distribution or chromaticity that can be controlled, so that a color temperature of light in the illuminated space can be identified and controlled. Thus, in these embodiments, control unit 102 drives or dims these LEDs as appropriate to form mixed chromaticity light that may be "white" or some other spectral combination, to provide a desired light chromaticity, alone or mixed with some amount of light 95. The functionalities described above can also be implemented with light sources other than LEDs.

A desired intensity and color temperature may be determined in a variety of ways. In simple cases, a minimum intensity and a specific color temperature may always be desired. In other cases, user input may be taken into account (e.g., bright light/cool color temperatures for tasks or to impart "high energy," or dim light/warm color temperatures for ambient lighting while specific areas are accented separately, or for "mood lighting"). In these and other cases, time of day, day of week and/or seasonal variations may also be taken into account.

While packaging the louver and artificial light functionalities within light fixture 100 is one possibility for embodiments herein, other components and/or arrangements are possible. For example, FIG. 10 is a schematic exploded diagram of a light fixture 500, illustrating certain components that may be present in embodiments. Light fixture 500 is configured for installation within a roof so as to conduct external light 95 from above a skylight 505 so that the light exits an output aperture 550 into an illuminated space below. The roof and a ceiling of the illuminated space are not shown, for clarity of illustration.

Skylight 505 provides weatherproofing and lets light 95 in. An optional diffuser 510 may be included; diffuser 510 may include one or more phosphors to shift some wavelengths of light 95 entering skylight 505 to longer wavelengths, but this is not required. An optional optic sphere 515 may be included to further diffuse and drive light 95 from skylight 505 further down into the underlying light tubes and other components, to increase light delivery efficiency. An optional curb 525 helps couple skylight 505 with the roof. When optional curb 525 is used, an optional curb transition 520 provides mechanical coupling between curb 525 and a first light tube 530. Optic sphere 515 thus protrudes downwardly into light tube 530.

Light tubes 530 are advantageously highly reflective on internal surfaces thereof, to maximize an amount of light 95 that can reach the illuminated space and to minimize heat generated by light absorption. The internal reflective surfaces can provide either specular or diffuse reflections. In certain embodiments, light tubes 530 are either formed from or internally coated with highly reflective materials such as coated anodized aluminum with greater than 94% reflectivity, available under the trade name of Alanod Miro. Still other embodiments include silver coated anodized aluminum with greater than 97% reflectivity, available under the trade name of Alanod Miro-Silver.

Light fixture 500 includes a louver 535 featuring a single louver blade 537. In embodiments that utilize tubes 530 that are round in cross section (or are at least rounded, such as ovals or ellipses) a single-blade louver may be easier to implement than multiple blades (e.g., blades 101 of light fixture 100). However, multiple blades 537 are also contemplated herein. Below louver 535, further light tubes 530 lead light 95 to a transition feature 540 that couples with a ceiling fixture 545 that defines output aperture 550. A further, optional diffuser may span output aperture 550, but this is not required.

A dimmable artificial light source 503 formed of a set of light emitters 504A, 504B, 504C is shown with light fixture 500. Light source 503 is considered part of light fixture 500, it being understood that a number of light emitters 504, and a location and manner of physical installation of light source 503 within light fixture 500 may vary. Each light emitter 504A, 504B, 504C emits a corresponding light output 595A, 595B, 595C, but light source may include as few as two light emitters 504, or three or more. For example, in some embodiments two light emitters 504A, 504B are present, with light output 595A of light emitter 504A being a "warm white" light with a color temperature in the range of 2500K to 3000K, while light output 595B of light emitter 504B is a "cool white" light with a color temperature in the range of 5000K to 7000K. In other embodiments, three light emitters 504A, 504B, 504C are present, with wavelengths of light output 595A of light emitter 504A being mostly in the red portion of the visible spectrum, wavelengths of light output 595B of light emitter 504B being mostly in the green portion of the visible spectrum, and wavelengths of light output 595C of light emitter 504C being mostly in the blue portion of the visible spectrum. In embodiments, collectively, any number of light emitters 504 can be controlled to provide output of a desired chromaticity, or complementary to a color temperature of external light 95, to produce a desired color temperature in an illuminated space below.

Placement of light source 503 within light fixture 500 may also vary. For example, light source 503 could be mounted beneath skylight 505, between diffuser 510 and optic 515 or within a light tube 530 above or below louver 535; or within ceiling fixture 545. Each of these locations will present a specific set of advantages and disadvantages. For example, mounting light source 503 above louver 535 will subject light outputs 595 to variation according to a position of louver 535, but may allow light outputs 595 to mix well with external light 95 before exiting light fixture 500. Mounting light source 503 below louver 535 will reduce impact of a position of louver blade 537 on light outputs 595, but might afford less mixing. Light source 503 could be mounted within ceiling fixture 545, but might then be directly visible to occupants of the illuminated space beneath. One of ordinary skill in the art, upon reading and comprehending the present disclosure, will readily recognize further alternatives, equivalents, modifications, and intermediate combinations of features.

FIG. 3 is an exploded, schematic view of an upper side and two lateral sides of light fixture 100 (FIG. 2) together with an optional skylight cover 200, light sensors 301, 302 and a user control panel 400. It should be understood that although light sensors 301, 302 and user control panel 400 are illustrated in the context of light fixture 100, that the functionalities described can also be implemented with some or all of the components of light fixture 500, FIG. 10. Relative sizes of light fixture 100, skylight cover 200 and light sensors 301, 302 are not necessarily drawn to scale. Also, although light sensors 301, 302 are shown as discrete elements, other forms of integration are possible. For example, in embodiments, either or both of light sensors 301, 302 are integrated with light fixture 100.

Control unit 102 of light fixture 100 communicatively couples with light sensors 301, 302. FIG. 3 illustrates light sensors 301, 302 connected with control unit 102 using wires 131, 132 respectively, but other forms of connectivity are possible; in embodiments, either or both of light sensors 301, 302 connect with control unit 102 using wireless forms of communication (e.g., WiFi, Bluetooth, etc.) instead of with wires 131, 132. Light sensor 301 provides information of intensity and chromaticity of light entering an open orifice of a roof, such as through skylight cover 200. The signal(s) from light sensor 301 are sometimes referred to as "daylight signal(s)" herein. Light sensor 302 provides information of intensity and chromaticity of light within a space illuminated by light fixture 100. Each of light sensors 301, 302 provides one or more signals in response to the light, conveying the intensity and chromaticity information. The signals conveying the intensity and chromaticity information may be independent of one another or convolved, and may be raw signals from photocells, photodiodes or the like (e.g., voltages or currents) or may be digitized and/or transformed. For example, sensor data may be processed at the sensor level, to provide representations of the detected light in the known RGB or xyY colorspaces, or other digital representations of the determined intensity or color temperature, in the signal(s) from the sensors. Each of light sensors 301, 302 communicatively couples with control unit 102.

Light sensor 301 will typically face upward, but may be reoriented as necessary to provide a useful indication of natural light. In embodiments, light sensor 302 may face downward, as suggested by its illustration in FIG. 3, and thus capture light reflected from the space being illuminated by light fixture 100; but in other embodiments light sensor 302 may face upward, essentially measuring light provided by light fixture 100 directly and irrespective of reflection from the illuminated space.

Control unit 102 is connected to a user control panel 400 that is accessible to a user. User control panel 400 may include mechanical or electrical switches, and may provide digital or analog input to control unit 102. In embodiments, user control panel 400 provides one or more of manual control, setup of programs, and execution of specified programs for the user. Certain such programs, and components of control unit 102 that implements the programs, are described below.

Figure 4:
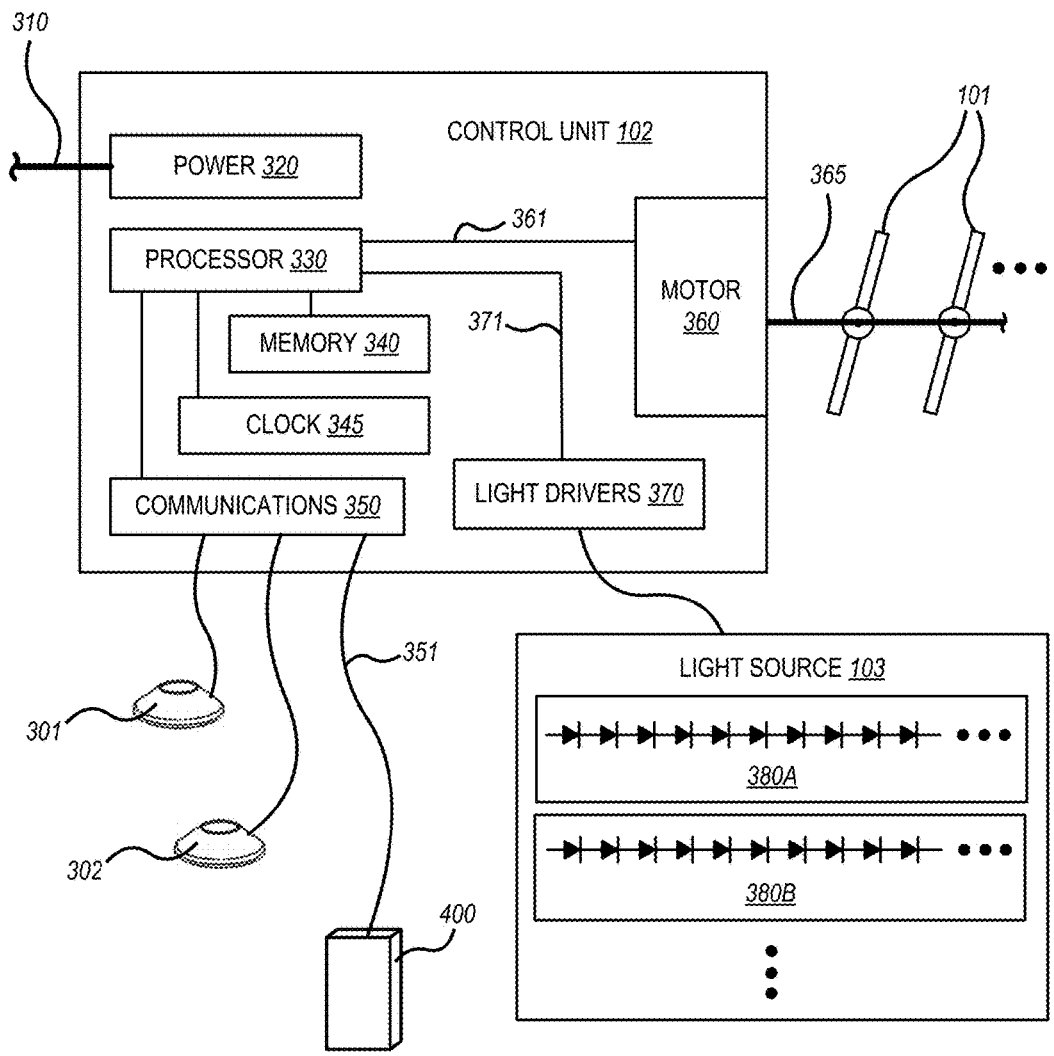
FIG. 4 is a schematic diagram that illustrates components of the control unit of the light fixture of FIG. 2, in an embodiment.

FIG. 4 is a schematic diagram that illustrates components of control unit 102 and how it provides control over key elements of light fixtures such as light fixture 100 (FIGS. 2 and 3) or light fixture 500 (FIG. 10). Control unit 102 includes power conditioning circuitry 320 that receives external power 310 and provides appropriately conditioned power to other components within light fixture 100, light source(s) 103, and, optionally, user control panel 400. For example, power conditioning circuitry 320 may convert 120 VAC line voltage provided as external power 310 to DC power and provide one or more low voltage (e.g., 0-24V) DC power supplies for various components as needed. Power connections from power conditioning circuitry 320 to other components are not shown, for clarity of illustration. Power, control signals, intensity and chromaticity information, and other connections may be implemented by single wires, paired wires or multiple wire cables (e.g., the well known Category 5 or CAT5, multiple twisted pair cable).

Control unit 102 includes a processor 330, a memory 340, optional clock circuit 345, communications circuitry 350, a motor 360, and light drivers 370. Memory 340 stores programs, settings and optionally schedules that can be set up by users using user control panel 400. Processor 330 executes the programs, utilizes the settings and schedules, and provides commands to motor 360 and light drivers 370 for operating louver blades 101 and light source 103, respectively. Motor 360 may include circuitry as necessary to provide voltage and/or current based on motor commands 361, and drive a mechanical linkage 365 that operates louver blade(s) 101. Light drivers 370 are circuits that provide appropriate voltage and/or current based on light commands 371, to drive light source 103.

It should be understood that, although power conditioning circuitry 320, processor 330, a memory 340, optional clock circuit 345, communications circuitry 350 and light drivers 370 are illustrated as separate components within a control unit, the functionality of these illustrated components may be grouped and/or distributed in any suitable manner that may be advantageous for a given design. For example, in certain embodiments, many of the functions of the illustrated components may be performed within a single chip. Other embodiments will use components not shown, such as discrete logic chips, motor controllers, additional sensors and the like, in addition to (or instead of) some of the illustrated components. One of ordinary skill in the art, upon reading and comprehending the present disclosure, will readily recognize further alternatives, equivalents, modifications, and intermediate combinations of these features.

Light source 103 is shown in FIG. 4 as including at least a first light emitting diode (LED) light source 380A and a second LED light source 380B, each light source 380 including one or more LEDs. Each light source 380 typically has a different chromaticity such that varying output of the light sources 380 relative to one another can produce different chromaticity output, either alone or in combination with additional (e.g., external) light. However, it should be understood that any number (e.g., two or more) or type of dimmable light sources 380, and any manner of electrical connectivity therein may be used to provide light source 103.

In embodiments, optional clock circuit 345 enables control unit 102 to provide a time based mode in which factory-set or user-defined programs run according to time of day, day of week, season of year, and the like. In these embodiments, user control panel 400 enables a user to set clock circuit 345 with the current time, which it maintains thereafter, and to specify intervals during which each program should run. Also, clock circuit 345 in combination with processor 330, memory 340 and sensors (e.g., sensors 301, 302) can enable embodiments herein to record data from the sensors with time stamps, and store the time-stamped data in memory 340 for future use. For example, an embodiment herein might regularly store intensity and/or chromaticity information (including chromaticity information in the form of color temperature values) for daylight at a particular installation, so that a profile of daily and/or seasonal daylight variations can be made available. The profile of daily and/or seasonal daylight variations can be used to establish a baseline of what light is normally available at the installation at a given date and time, which can then be used to set desired intensity and/or color temperatures when local weather interferes with the normal daylight profile. Programs may also be set up to enhance the normal daylight profile, such as by providing "scenes," like sunrise/sunset illumination (e.g., accented with pink or orange chromaticity to mimic scattering from clouds), a cloudy or rainy day (e.g., with a neutral or "gray" color temperature all day), brief changes that might emulate the intensity and color temperature variations of passing clouds, or other scenes.

Control unit 102 communicates with user control panel 400 through communications circuitry 350. A connection 351 shown in FIG. 4 may be a physical wire or cable (e.g., a single or multiple wire cable suitable for implementing any direct electrical connection protocol) or may be a wireless connection such as WiFi, Bluetooth and the like.

Figure 5:
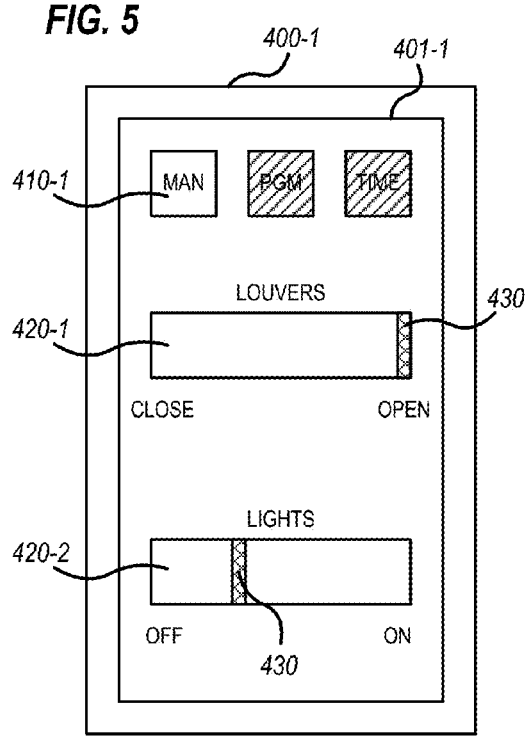
FIG. 5 is a view of the face of an exemplary user control panel, illustrating manual controls for use with the light fixture of FIG. 2, in an embodiment.
Figure 6:
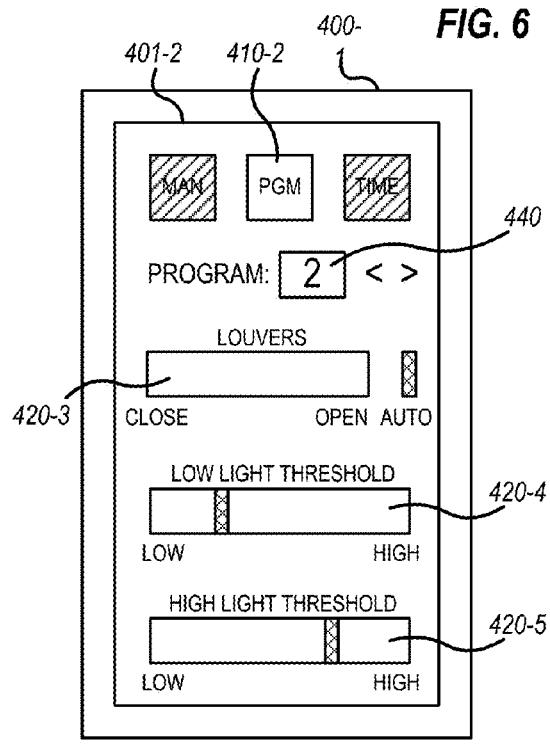
FIG. 6 is another view of the face of the exemplary user control panel, illustrating programming features for use with the light fixture of FIG. 2, in an embodiment.
Figure 7:
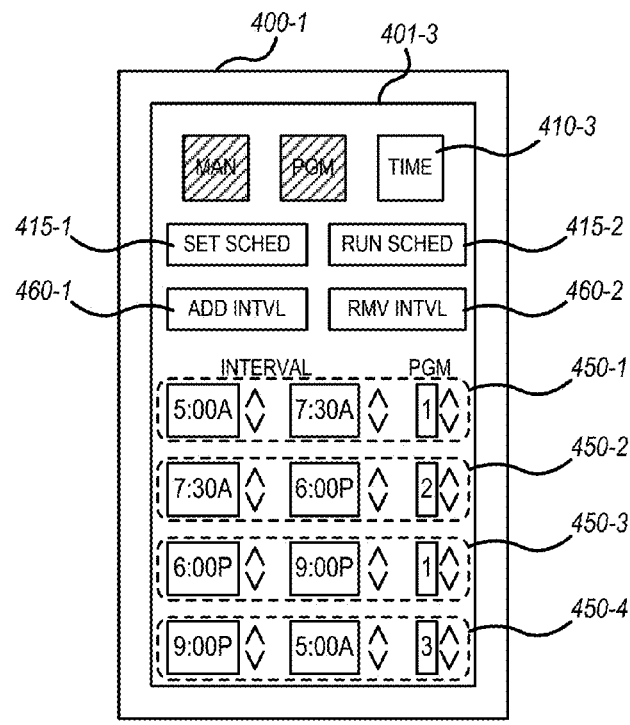
FIG. 7 is another view of the face of the exemplary user control panel, illustrating scheduling features for use with the light fixture of FIG. 2, in an embodiment.

FIG. 5 is a first view of the face of an exemplary user control panel 400-1, illustrating manual controls for use with light fixture 100 (FIG. 2). FIG. 6 is a second view of the face of exemplary user control panel 400, illustrating programming features for use with light fixture 100. FIG. 7 is a third view of the face of exemplary user control panel 400-1, illustrating scheduling features for use with light fixture 100. Exemplary control panel 400-1 is shown for purposes of illustrating a limited selection of control panel features (which do not include control of color temperature; see FIGS. 11, 12, 13 below).

FIGS. 5, 6 and 7 illustrate a first exemplary user control panel 400-1 with exemplary screens 401-1, 401-2 and 401-3, respectively, which may be collectively referred to as screens 401. Control panel 400-1 may be implemented as a physical control unit or remote control that is wired to light fixture 100, or may communicate wirelessly thereto; in particular control panel 400-1 may be implemented using touch-screen technology on a dedicated control unit or on a user device such as a smartphone or tablet. In embodiments, screens 401-1, 401-2 and 401-3 may be alternate presentations provided on a screen of a physical unit or user device; alternatively, these screens and/or features thereof may be available simultaneously. Many options for providing equivalent or similar functionality will become apparent to those skilled in the relevant art. Screens 401-1, 401-2 and 401-3 are now described in sufficient detail as to enable implementation of control panels with equivalent or similar functionality.

Screen 401-1, FIG. 5, shows control panel 400-1 in a selected "manual" mode indicated by appearance of a feature 410-1, which may be a physical button or an icon on a touch-screen. In embodiments, the mode of operation is selected by tapping feature 410-1, causing it to have an appearance indicating the selected mode while causing other features to have an appearance indicating they are not selected. Beneath these features are slider or switch controls 420-1 (labeled "LOUVERS") and 420-2 (labeled "LIGHTS"); hereafter termed "slider controls" 420, notwithstanding that mechanical switches (e.g., potentiometers) may be used to provide such functionality. Using slider control 420-1, a user may set louver blades 101 (by moving a slider bar 430) to fully open or closed positions, or any setting in between, using the controls. Similarly, using slider control 420-2, the user may set the artificial light to a full on, off, or any dim setting in between, using a slider bar 430. This gives the user countless combinations of Daylighting and Artificial Lighting combinations. Slider controls 420-1 and 420-2 can be touch-screen features or mechanical switches that provide similar functionality, or can be replaced by other means for indicating values such as "open," "closed," "on," "off" and intermediate values.

Screen 401-2, FIG. 6, shows control panel 400-1 in a selected "program" mode indicated by appearance of a feature 410-2, which may be a physical button or an icon on a touch-screen. Screen 401-2 allows a user to create programs and/or to customize pre-installed programs. In embodiments, these programs cause control unit 102 to monitor the amount of light provided in a designated space (through a signal from light sensor 302, FIG. 3) and adjust the louver blades 101 and artificial light source 103 accordingly, to illuminate the space at a specific light level, as desired by the user.

In screen 401-2, a feature 440 indicates a specific program being created and/or customized. The user may provide a louver setting using a slider control 420-3, or may set slider control 420-3 to an alternative, "AUTO" setting that gives control unit 102 latitude to adjust louver settings according to light signal from sensor 301 (FIG. 3). The user determines an amount of light required in a specified space, and indicates this desire using slider controls 420-4 and 420-5 to set a low light threshold and/or an optional high light threshold respectively. In embodiments, control unit 102 operates artificial light source 103 while the user operates slider controls 420-4 and 420-5, so that the user can experience the light level being requested.

Programs created and/or customized by a user using control panel 400 may not include all of the possible settings shown in FIG. 6, and/or may include additional settings. For example, screen 401-2 does not include a slider indicating light to be provided by artificial light source 103, because it runs light source 103 based on low and high light levels; however, explicit control of light source 103 could be included. Similarly, controls or switches indicating a desired operation without respect to light levels (for example, a "don't care" with respect to signals from light sensors 301, 302) are possible.

In operation of certain program embodiments, light sensor 301 determines an amount of natural light available to illuminate the specified space, while light sensor 302 determines the amount of light actually provided to the specified space. A low daylight threshold for natural light may be factory-set, or may be provided by a user with screens or controls like those illustrated in screens 401-1, 401-2. Many programs will typically be set up such that when light sensor 301 does not detect outside light, control unit 102 will close louver blades 101 to avoid light pollution caused by light from artificial light source 103 (or other light sources of the illuminated space) exiting through skylight aperture 110. In this case, artificial light source 103 is turned on and increased in brightness until the signal from light sensor 302 indicates that the low light threshold is met.

If the signal from light sensor 301 indicates that there is at least some natural light available, control unit 102 will open louver blades 101 at least partially, and continue to open them until the signal from light sensor 302 indicates that the low light threshold is met, or until louver blades 101 are fully open. If louver blades 101 are fully open but the signal from light sensor 302 does not indicate that the low light threshold is met, artificial light source is turned on and increased in brightness until the signal from light sensor 302 indicates that the low light threshold is met. Automatic adjustment of artificial light source so that the signal from light sensor 302 remains above the low light threshold is referred to as "servo" operation below. For energy efficiency, preference is normally given to maximum use of natural light to meet the low light threshold before artificial light source 103 is used, but control panel 400 can override this preference if desired by the user. In some embodiments, a high light threshold is provided using slider control 420-5, and a program that includes the high light threshold will not only turn off artificial light 103 completely, but will partially close louver blades 101 until the signal from light sensor 302 indicates that the light in the space illuminated by light fixture 100 is less than the high light threshold. Operation of louver blades 101 in this mode is referred to as "servo" operation below.

In some cases, the capabilities of light sources herein (e.g., light sources 103, 503) cannot simultaneously satisfy both color temperature and intensity requirements. For example, if bright light at a high color temperature is desired, and early morning or late afternoon sunlight is dim and of a low color temperature, it may not be possible to drive a "cool white" light emitter hard enough to provide enough high color temperature light to provide light of the desired brightness and color temperature. Operating a "warm white" light emitter to boost the intensity could provide enough intensity to reach the low light threshold, but in doing so, will provide light of a color temperature that is warmer than desired. Therefore, programs herein may be set up to provide one of the desired intensity and the desired color temperature, in preference to the other. That is, in some embodiments, the control unit will be configured to control the intensity and the color temperature of the dimmable artificial light source so as to bring the intensity of the light illuminating the space to at least the low light threshold even if the desired color temperature cannot be achieved. In other embodiments, the control unit will be configured to control the intensity and the color temperature of the dimmable artificial light source so as to bring the color temperature of the light illuminating the space to the desired color temperature even if the low light threshold cannot be achieved.

In other embodiments, programs can provide settings for louver blades 101 and artificial light source 103 that do not monitor or adjust operation according to light levels.

Various programs may be created and/or customized through the use of control panels 400-1. Examples of some such programs are listed in Table I below, but these are not an exclusive or exhaustive list. Many other program types and settings will become evident to one skilled in the art upon reading and comprehending the present specification and drawings.

Program 1, designated "On/twilight" is set to allow daylight, if present, into the space illuminated by light fixture 100, to close louver blades 101 to prevent light pollution if daylight is not present, and to keep artificial light source 103 off for energy savings. Program 2, designated "On/normal" is set to close louver blades 101 if dark outside, to open louver blades 101 if natural light is present, and to coordinate actions of louver blades 101 and artificial light source 103 to provide comfortable light levels, giving preference to natural light for energy savings. Program 3 is an "Off" program that simply closes louver blades 101 and turns off artificial light source 103 regardless of light levels.

Program and light level definitions for Table I below are as follows. "Area light" is defined as a light level determined by evaluation of a signal from the area illuminated (e.g., from sensor 302). A "Low" Area light level means light level determined from sensor 302 is below a low light threshold (typically customizable by a user, see FIG. 6). A "Mid" Area light level means light level determined from sensor 302 is above the low light threshold, but below a high light threshold. A "High" Area light level means light level determined from sensor 302 is above the high light threshold. "Natural light" is defined as a light level determined by evaluation of a signal from outside (e.g., from sensor 301). A "Dark" Natural light level means light level determined from sensor 301 is below a low daylight threshold. A "Light" Natural light level means light level determined from sensor 301 is above the low daylight threshold.

TABLE I

Exemplary program settings

| Program nbr/type | Area light | Natural light | Louver Control | Light Control |
|---|---|---|---|---|
| 1 On/twilight | Don't care | Dark | Closed | Off |
|  | Don't care | Light | Open | Off |
| 2 On/normal | Low | Dark | Closed | Servo |
|  | Mid | Dark | Closed | Servo |
|  | High | Dark | Closed | Servo |
|  | Low | Light | Open | Servo |
|  | Mid | Light | Servo | Servo |
|  | High | Light | Servo | Off |
| 3 Off | Don't care | Don't care | Closed | Off |

Screen 401-3, FIG. 7, shows control panel 400-1 in a selected "time" mode indicated by appearance of a feature 410-3, which may be a physical button or an icon on a touch-screen. Screen 401-3 allows a user to create and/or to customize a schedule that switches among programs according to time of day, day of week, and the like. Screen 401-3 illustrates how programs may be designated to operate during four daily time intervals, the start time, end time and program number for each interval being designated as 450-1, 450-2, 450-3 and 450-4 respectively. A user may use feature 415-1 to put control panel 400-1 into a "Set schedule" mode to allow changes to the schedule, and may use feature 415-2 to put control panel 400 into a "Run schedule" mode to begin operation according to the schedule. In the "Set schedule" mode, program intervals can be added or removed from the schedule by using the "Add interval" and "Remove interval" features 460-1 and 460-2, respectively. The user can select a desired number of intervals, create or adjust starting and stopping times of each interval, and associate a program with each interval.

Figure 11:
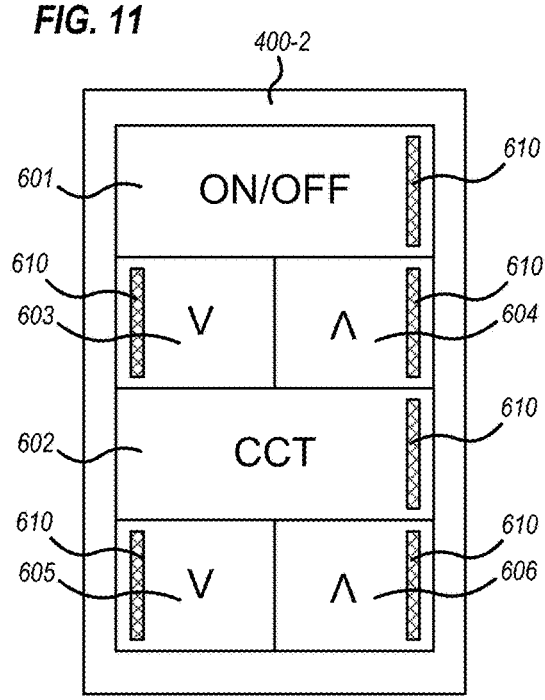
FIG. 11 illustrates a user control panel that is implemented with buttons, according to an embodiment.
Figure 12:
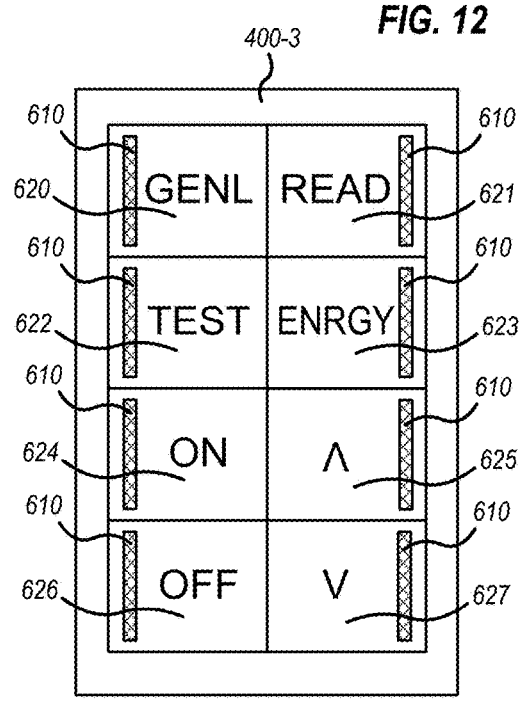
FIG. 12 illustrates a user control panel that is implemented with buttons, according to an embodiment.
Figure 13:
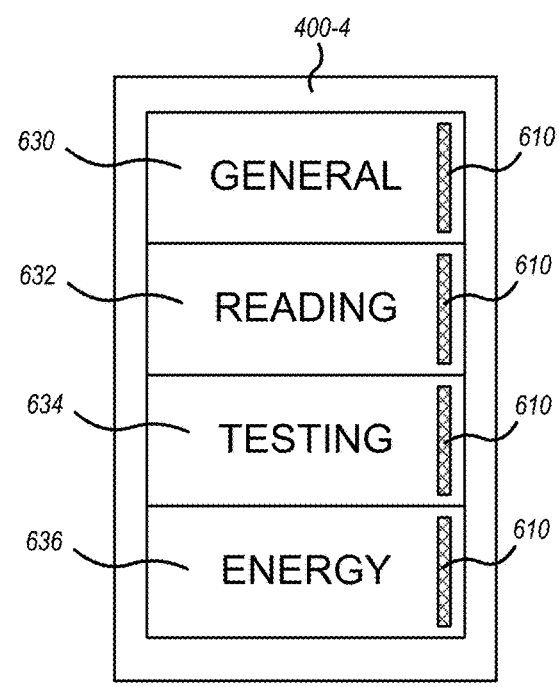
FIG. 13 illustrates a user control panel that is implemented with buttons, according to an embodiment.

FIGS. 11, 12 and 13 illustrate further exemplary user control panels 400-2, 400-3 and 400-4 that are implemented with buttons, as opposed to screen based control panel 400-1 illustrated in FIGS. 5, 6 and 7. Control panels 400-2, 400-3 and 400-4 provide control over light intensity and color temperature.

In FIG. 11, control panel 400-2 includes buttons 601 and 602 for selecting light on/off and correlated color temperature (CCT) adjustment functionalities, respectively. Beneath on/off button 601, buttons 603 and 604 increase and decrease light intensity (e.g., to be provided by light fixture 100 or 500, using either external or artificial lights as described herein). Beneath CCT button 602, buttons 605 and 606 allow user control over color temperature. Optional indicators 610 on each of buttons 601-606 can light when operated to provide feedback to a user that input was received. Indicators 610 may display for transitory or indefinitely long periods. In particular, indicator 610 on button 601 may remain on while power to the associated light fixture remains on, and indicator 610 on button 602 may remain on while color temperature of the associated light fixture is being controlled, and off while the associated light fixture is not operating under any user input for color temperature.

In FIG. 12, control panel 400-3 includes buttons 620 through 627 for selecting on/off functionality, light intensity control, and a variety of pre-set color temperatures appropriate for classroom environments. Buttons 620, 621, 622 and 623 select color temperatures designated as "general," "reading," "testing" and "energy." For example, buttons 620, 621, 622 and 623 may be used to direct an associated light fixture to provide appropriate color temperature ambient lighting for general, reading, test-taking, and high energy classroom activities. Exemplary choices for these color temperatures could be about 3000K for reading, 3500K for test taking, 4200K for general activities, and 5000K for high energy activities. Buttons 624 and 626 can be used to turn the associated light fixture on or off, and buttons 625 and 627 can be used to increase or decrease intensity of light from the light fixture. All of buttons 620 through 627 may include optional indicators 610 that can be used to provide user feedback, similar to the case of control panel 400-2. In FIG. 13, control panel 400-4 includes buttons 630, 632, 634 and 636 for selecting the same "general," "reading," "testing" and "energy" color temperature ambient lighting as buttons 620, 621, 622 and 623 of control panel 400-3. Control panel 400-4 may be used as an additional control panel for color temperature control in connection with separate on/off and/or light intensity controls.

Figure 8:
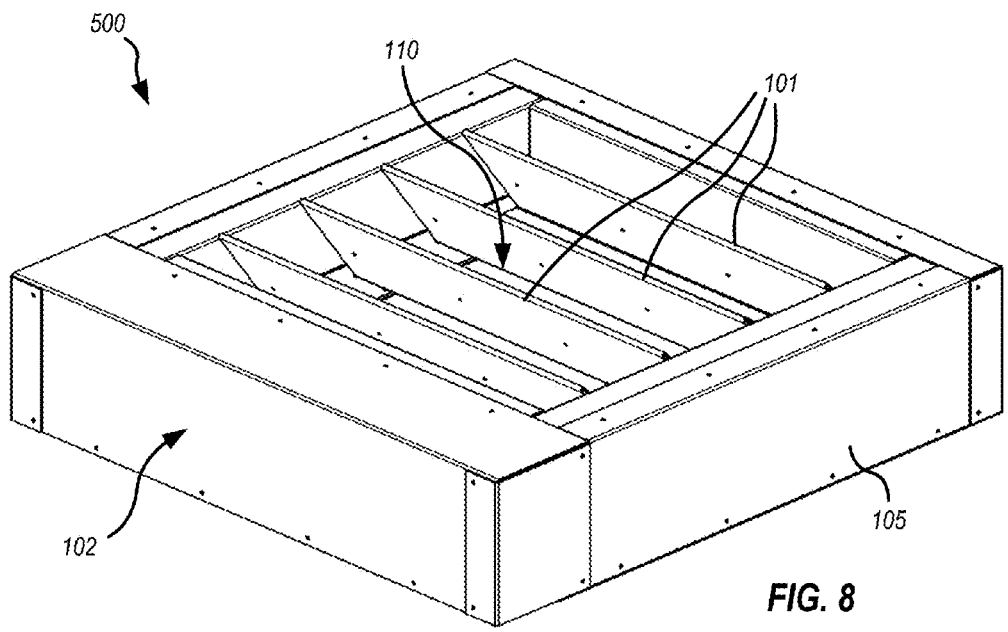
FIG. 8 is an engineering drawing of an embodiment of this invention similar to the light fixture embodiment shown in FIG. 3.

FIG. 8 is an engineering drawing of a light fixture 500 in a view that is similar to the view of light fixture 100, FIG. 3.

Figure 9:
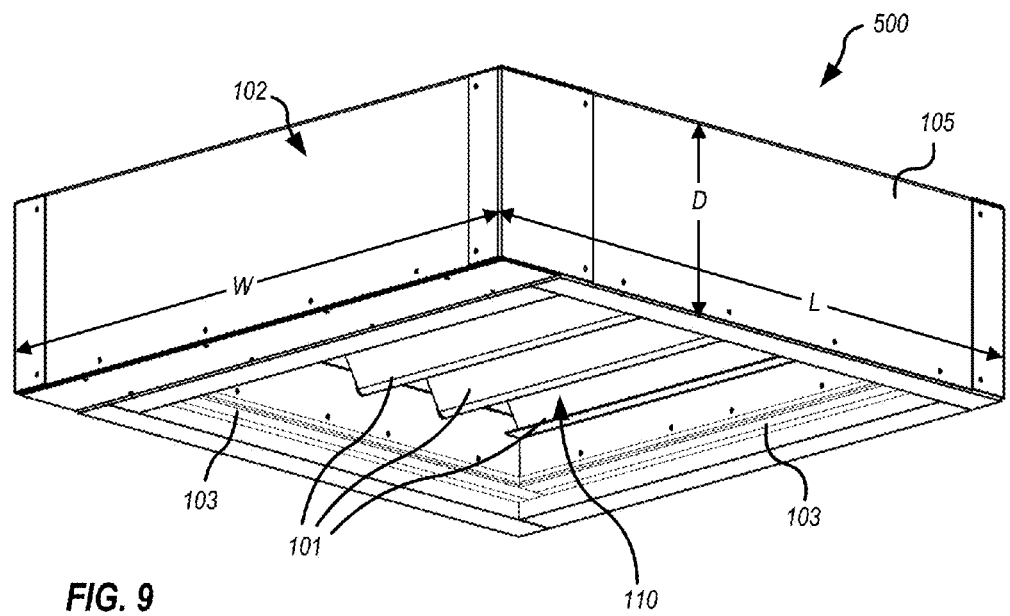
FIG. 9 is an engineering drawing of an embodiment of this invention similar to the embodiment shown in FIG. 2.

FIG. 9 is an engineering drawing of light fixture 500 in a view that is similar to the view of light fixture 100, FIG. 2. Directions of width W, length L and depth D are noted in FIG. 9. As discussed above, embodiments such as light fixture 500 can be of many sizes. Depth D is typically less than seven inches and is usually four to six inches. Width W is typically about 18 inches to about six feet, while length L is typically about 18 inches to about ten feet.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A light fixture that delivers light to an illuminated space, comprising:
   a housing that defines a skylight aperture therethrough;
   one or more movable louver blades coupled to the housing and spanning the skylight aperture defined in the housing, wherein:
      in an open position, the one or more movable louver blades do not substantially block light from passing through the skylight aperture,
      in a closed position, the one or more movable louver blades block substantially all light from passing through the skylight aperture, and
      in intermediate positions between the open position and the closed position, the one or more movable louver blades block a portion of light from passing through the skylight aperture;
   a dimmable artificial light source that is integrated with the housing about a lower perimeter of the skylight aperture and that is configured to project artificial light toward the illuminated space;
   a light sensor that detects light illuminating the space and provides one or more signals in response thereto, wherein the light sensor:
      detects both intensity information and color temperature information of the light illuminating the space, and
      the one or more signals convey at least the intensity information and the color temperature information; and
   a control unit that is integrated with the housing and is communicatively coupled with the light sensor, wherein the control unit:
      receives the signal from the light sensor, and
      controls a position of the one or more movable louver blades, an intensity of the dimmable artificial light source, and a chromaticity of the dimmable artificial light source, in response to at least the one or more signals from the light sensor.

2. The light fixture of claim 1, wherein:
   the dimmable artificial light source includes at least first and second LED light sources,
      wherein the first LED light source is characterized by a first color temperature, and
      the second LED light source is characterized by a second color temperature that is different from the first color temperature; and
   the control unit controls the chromaticity of the dimmable artificial light source by increasing light output of one of the first and second LED light sources relative to light output of the other of the first and second LED light sources, so as to shift a color temperature of the dimmable artificial light source toward the color temperature of the one of the first and second LED light sources.

3. The light fixture of claim 1, wherein:
   the control unit includes a processor and a memory;
   the memory stores a plurality of programs; and
   at least a first one of the plurality of programs is configured:
      to determine a current color temperature of light in the illuminated space from the one or more signals from the light sensor;
      and, when the current color temperature differs from a desired color temperature of light in the illuminated space:
         to control the chromaticity of the dimmable artificial light source so that the artificial light provides a chromaticity that adjusts the current color temperature toward the desired color temperature.

4. The light fixture of claim 3, wherein the desired color temperature of the illuminated space is a factory setting.

5. The light fixture of claim 3, wherein the first one of the plurality of programs is further configured to determine the desired color temperature for the illuminated space based on input provided by a user.

6. The light fixture of claim 3, wherein:
   the control unit includes a real time clock, and
   the first one of the plurality of programs is further configured to select the desired color temperature for the illuminated space based on time of day, as determined by the real time clock.

7. The light fixture of claim 3, wherein:
   the light sensor is a first light sensor;
   the one or more signals are one or more first signals; and
   the light fixture further comprises a second light sensor, disposed opposite the louver blades from the illuminated space and communicatively coupled with the control unit;

wherein the second light sensor detects natural light and provides one or more daylight signals in response thereto; and at least a second one of the plurality of programs is configured to determine the desired color temperature for the illuminated space based on the one or more daylight signals and the one or more first signals.

8. The light fixture of claim 3, wherein:

the light sensor is a first light sensor;

the one or more signals are one or more first signals;

the control unit includes a real time clock; and the light fixture further comprises a second light sensor, disposed opposite the louver blades from the illuminated space and communicatively coupled with the control unit;

wherein the second light sensor detects natural light and provides one or more daylight signals in response thereto; and at least a second one of the plurality of programs is configured to:

record color temperature information of the one or more daylight signals with information from the real time clock; and use the color temperature information of the one or more daylight signals to determine a set of desired color temperatures for the illuminated space that vary according to time of day, as determined by the real time clock.

9. The light fixture of claim 3, wherein the control unit includes a real time clock, and is configured to implement the first one of the plurality of programs during a first time of day and to implement a second one of the plurality of programs during a second time of day.

10. The light fixture of claim 3, wherein the first one of the plurality of programs is further configured to open the louver blades when the signal indicates the intensity of the light illuminating the space is below a low light threshold.

11. The light fixture of claim 10, wherein the control unit is configured to control the intensity and the chromaticity of the dimmable artificial light source so as to bring the intensity of the light illuminating the space to at least the low light threshold even if the desired color temperature cannot be achieved.

12. The light fixture of claim 10, wherein the control unit is configured to control the intensity and the chromaticity of the dimmable artificial light source so as to bring the color temperature of the light illuminating the space to the desired color temperature even if the low light threshold cannot be achieved.

* * * * *

UNITED STATES PATENT AND TRADEMARK OFFICE
CERTIFICATE OF CORRECTION

PATENT NO. : 9,897,289 B2  
APPLICATION NO. : 15/416465  
DATED : February 20, 2018  
INVENTOR(S) : Phoebus Biron, James Mathew Ernst and Ryan Zaveruha Page 1 of 1

It is certified that error appears in the above-identified patent and that said Letters Patent is hereby corrected as shown below:

On the Title Page

In item (73), in "Assignee", Line 1, delete "Holdings" and insert -- Holding --, therefor.

Signed and Sealed this
Tenth Day of April, 2018

Andrei Iancu
*Director of the United States Patent and Trademark Office*